US010428833B2

(12) United States Patent
Cortequisse

(10) Patent No.: US 10,428,833 B2
(45) Date of Patent: Oct. 1, 2019

(54) AXIAL TURBOMACHINE COMPRESSOR CASING

(71) Applicant: Techspace Aero S.A., Herstal (Milmort) (BE)

(72) Inventor: Jean-François Cortequisse, Heers (BE)

(73) Assignee: SAFRAN AERO BOOSTERS SA, Herstal (Milmort) (BE)

( * ) Notice: Subject to any disclaimer, the term of this patent is extended or adjusted under 35 U.S.C. 154(b) by 539 days.

(21) Appl. No.: 15/190,336

(22) Filed: Jun. 23, 2016

(65) Prior Publication Data

US 2016/0377091 A1 Dec. 29, 2016

(30) Foreign Application Priority Data

Jun. 26, 2015 (BE) .................................. 2015/5394

(51) Int. Cl.
*F04D 29/54* (2006.01)
*F04D 29/52* (2006.01)
(Continued)

(52) U.S. Cl.
CPC ........... *F04D 29/542* (2013.01); *F01D 9/044* (2013.01); *F01D 25/246* (2013.01);
(Continued)

(58) Field of Classification Search
CPC ........ F01D 9/042; F01D 9/044; F01D 25/246; F01D 5/282
See application file for complete search history.

(56) References Cited

U.S. PATENT DOCUMENTS 5,158,430 A * 10/1992 Dixon ................... F01D 11/005
  415/134
5,180,281 A * 1/1993 Burge ....................... F01D 9/00
  415/209.2

(Continued)

FOREIGN PATENT DOCUMENTS

EP  2821595 A1  1/2015
EP  2833001 A1  2/2015
JP  2961076 B2  5/1997

OTHER PUBLICATIONS

Hillman Group, Steel Tubular & Split Rivet, Sep. 22, 2013 (accessed Oct. 25, 2018).*
Search Report dated Mar. 14, 2016 for BE 201505394.

*Primary Examiner* — Justin D Seabe
*Assistant Examiner* — Jose M Siguenza, Jr.
(74) *Attorney, Agent, or Firm* — James E. Walton

(57) ABSTRACT

The present application relates to an axial turbomachine low-pressure compressor stator. The stator includes an outer annular casing made of organic matrix composite materials. The stator also has groups of vanes having an outer shroud, several rows of stator vanes spaced axially from one another, and segments of inner shrouds at the inner ends of the vanes. The rows of stator vanes are aligned along the circumference of the casing. Each outer shroud is pressed against the inside of the casing so it can be fastened by means of attachment pins. The outer shroud, and the rows of vanes of said group forming a one-piece assembly. The device of the present application reduces the number of vane attachment elements to a few attachment portions distributed on the shroud.

18 Claims, 4 Drawing Sheets

(51) Int. Cl.
  *F01D 9/04*   (2006.01)
  *F01D 25/24*  (2006.01)
  *F04D 29/32*  (2006.01)
  *F04D 29/08*  (2006.01)
  *F04D 29/02*  (2006.01)

(52) U.S. Cl.
  CPC ......... *F04D 29/023* (2013.01); *F04D 29/083* (2013.01); *F04D 29/321* (2013.01); *F04D 29/526* (2013.01); *F05D 2230/53* (2013.01); *F05D 2240/12* (2013.01); *F05D 2300/603* (2013.01); *Y02T 50/672* (2013.01)

(56) References Cited

U.S. PATENT DOCUMENTS

| | | | | |
|---|---|---|---|---|
| 8,061,978 | B2* | 11/2011 | Tholen | C23C 4/18 |
| | | | | 415/173.1 |
| 8,414,256 | B2* | 4/2013 | Cortequisse | B23K 1/0018 |
| | | | | 415/199.5 |
| 8,454,303 | B2* | 6/2013 | Garcia-Crespo | F01D 9/042 |
| | | | | 415/137 |
| 2009/0185899 | A1* | 7/2009 | Bouchard | F01D 9/02 |
| | | | | 415/209.3 |
| 2013/0000324 | A1 | 1/2013 | Alvanos | |
| 2013/0129494 | A1* | 5/2013 | Duchaine | F01D 9/041 |
| | | | | 415/191 |
| 2015/0027131 | A1* | 1/2015 | Takeda | B23P 6/00 |
| | | | | 60/805 |
| 2015/0063990 | A1* | 3/2015 | Naert | F01D 11/001 |
| | | | | 415/173.3 |

* cited by examiner

AXIAL TURBOMACHINE COMPRESSOR CASING

This application claims priority under 35 U.S.C. § 119 to Belgium Patent Application No. 2015/5394, filed 26 Jun. 2015, titled "Axial Turbomachine Compressor Casing," which is incorporated herein by reference for all purposes.

BACKGROUND

1. Field of the Application

The present application relates to an axial turbomachine stator with a reduced number of attachments. The present application also relates to a stator with groups of axial turbomachine compressor vanes. The present application also proposes a turboprop or a turbojet engine of an aircraft.

2. Description of Related Art

An axial turbomachine compressor has a plurality of rows of vanes, at times rotor, at times stator. Their alternation gradually compresses the incoming flow while ensuring high throughput. The rows of stator vanes are supported by an external casing which also forms a mechanical link between the splitter fairing and the intermediate casing of the turbomachine. The outer casing plays a dual role in terms of sealing since it avoids secondary flows above the vanes and it receives the annular layers of abradable material to form annular seals around the rotor vanes.

The casing supports each vane individually, and thereby maintains them in a predetermined orientation and position to ensure optimum performance. In order to simplify the attachment of the vanes on the casing, it is known to group several stator vanes together by means of common platforms. They are then attached to the casing using a reduced number of screws.

Document EP 2 821 595 A1 discloses an axial turbomachine low-pressure compressor. The compressor comprises a composite outer casing supporting several rows of stator vanes between which the rows of rotor vanes move. The stator vanes are grouped together to form vane sectors, the platforms of which are linked together so as to form a common mounting bracket. The sector is attached by means of screws provided on the common mounting brackets. This configuration reduces the number of attachment pins in relation to the number of vanes, while favouring lightness and rigidity. However, the number of attachment pins remains high.

Although great strides have been made in the area of axial turbomachine compressor casing, many shortcomings remain.

DETAILED DESCRIPTION OF THE PREFERRED EMBODIMENT

Figure 1:
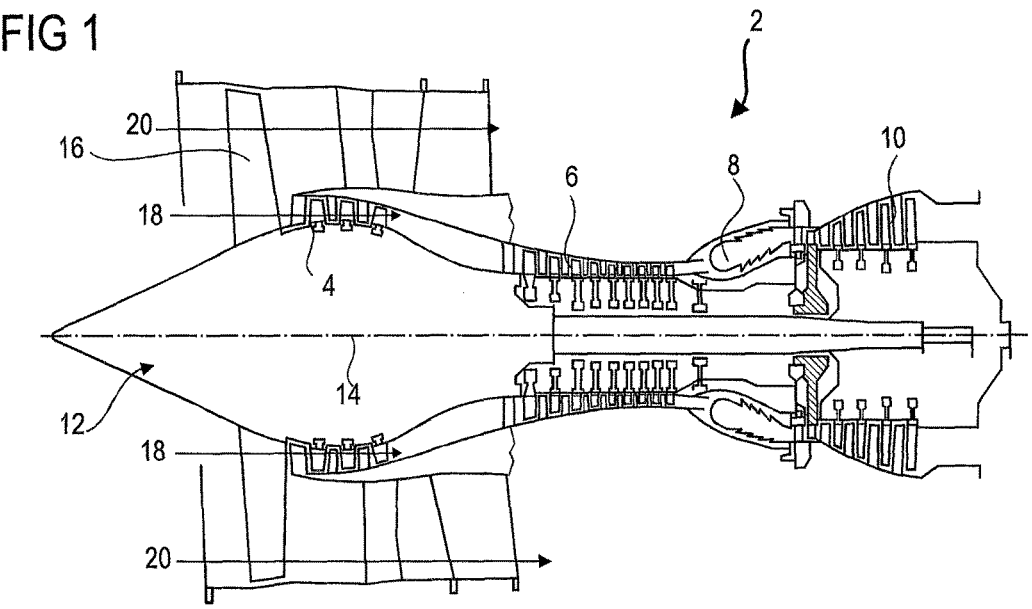
FIG. 1 represents an axial turbomachine according to the present application.

The present application aims to solve at least one of the problems of the prior art. More particularly, the present application aims to simplify the attachment of the vanes on an axial turbomachine stator. The present application also aims to stiffen an axial turbomachine stator.

The present application relates to an axial turbomachine stator, notably an axial turbomachine compressor, the stator comprising: an outer annular casing with an inner annular surface; and at least one group of vanes with: a row of stator vanes arranged in the circumference of the casing, and an outer shroud for attaching vanes to the casing, the shroud matching the inner surface of the casing; remarkable in that at least one or each group of vanes comprises a plurality of rows of axially-offset stator vanes, the outer shroud and the rows of vanes of said group being a single-piece assembly.

According to an advantageous embodiment of the present application, at least one or each vane group shroud extend axially over the entire length of the casing, and preferably forms a hermetic skin over the entire axial length of the casing.

According to an advantageous embodiment of the present application, the casing comprises an annular wall on which the inner surface is formed; and at least one, preferably two annular mounting flanges arranged at the axial ends of the annular wall.

According to an advantageous embodiment of the present application, the outer casing is made of a composite material, notably an organic matrix.

According to an advantageous embodiment of the present application, the composite casing comprises a fibre preform, preferably with a stack of woven plies and/or a three-dimensionally woven mattress.

According to an advantageous embodiment of the present application, at least one or each group of vanes is formed in one piece.

According to an advantageous embodiment of the present application, at least one or each outer shroud comprises a main outer surface with outer cavities closed by the casing.

According to an advantageous embodiment of the present application, at least one or each group of vanes comprises at least three rows of stator vanes, preferably at least four rows of stator vanes spaced axially from one another, preferably distributed axially along the casing.

According to an advantageous embodiment of the present application, at least one or each outer shroud comprises attachment portions such as attachment pins, possibly threaded, the portions preferably extending radially.

According to an advantageous embodiment of the present application, at least one or each attachment portion comprises plastically deformed branches so as to integrally secure the corresponding shroud to the casing.

According to an advantageous embodiment of the present application, the stator comprises an annular space separating two consecutive rows of vanes of the same group of vanes, the space being adapted to receive an annular row of rotor vanes of the turbomachine.

According to an advantageous embodiment of the present application, the stator comprises several groups of vanes, and vanes with attachment platforms connected to the casing, the platforms of vanes being arranged between groups of vanes, preferably in the circumferential direction.

According to an advantageous embodiment of the present application, at least one or each group comprises inner shrouds integral with the inner ends of the vanes of said group.

According to an advantageous embodiment of the present application, the stator comprises several groups of vanes and at least one or more angular segments of inner shrouds arranged between the groups of vanes, the inner shroud segments are possibly connected to the inner ends of said vanes or to the inner shrouds of the groups.

According to an advantageous embodiment of the present application, at least one or each group comprises one or more annular zones for receiving seals, notably layers of abradable material, intended to ensure sealing with the rows of rotor vanes; said zones possibly comprising a surface with a roughness Ra greater than 10 μm, and/or a mesh.

According to an advantageous embodiment of the present application, the stator vanes of at least one or each row of vanes of at least one or each group are arranged in the circumference of the casing.

According to an advantageous embodiment of the present application, the outer casing comprises a main inner surface, at least one or each outer shroud comprises a main outer surface in contact with the main inner surface, possibly matching the main inner surface, preferably pressed against the main inner surface. The main aspect may be associated to the area.

According to an advantageous embodiment of the present application, the casing comprises openings through which the attachment portions of the outer shrouds pass.

According to an advantageous embodiment of the present application, at least two consecutive rows of vanes of the same group are spaced apart by a distance greater than or equal to the axial length of one of said rows of vanes.

According to an advantageous embodiment of the present application, the stator comprises several groups of vanes; the outer shrouds cover the entire internal surface of the casing.

According to an advantageous embodiment of the present application, at least one or each group comprises an outer shroud in the shape of a quadrilateral with corners, said group comprising an attachment portion at each corner of the quadrilateral, preferably the attachment portions of each group are joined at the corners.

According to an advantageous embodiment of the present application, at least one or each group comprises at least ten times more, preferably at least fifteen times more, and even more preferably at least twenty times more stator vanes than attachment portions.

The present application also relates to an axial turbomachine primary airflow compressor, the compressor comprising a stator provided with an outer annular casing with an inner annular surface; and at least one group of vanes with: a row of stator vanes arranged along the circumference of the casing, and an outer shroud for attaching vanes to the casing, the shroud matching the inner surface of the casing and being in contact with the primary flow, preferably axially guiding the primary flow; remarkable in that at least one or each group of vanes comprises a plurality of rows of axially-offset stator vanes, the outer shroud and the rows of vanes of said group being a single-piece assembly.

The present application also relates to a turbomachine comprising a stator, remarkable in that the stator is in compliance with the present application; preferably the turbomachine comprises a low-pressure compressor, the stator being the stator of said low-pressure compressor.

According to an advantageous embodiment of the present application, the turbomachine comprises a one-piece rotor, the casing comprising two half-shells united together around said one-piece rotor.

Generally speaking, the advantageous modes of each object of the present application also apply to the other objects of the present application. As far as possible, each object of the present application can be combined with the other objects.

The vanes are reunited in wedge-shaped segments forming the casing of the compressor. The present application considerably reduces the resources required to attach the stator vanes. Each attachment pin contributes to the fastening of several rows of stator vanes. In this way, the number of fastening openings to be provided in the casing is reduced. This preserves the mechanical strength of the casing and limits the risk of leaks.

The present application also enables a hermetic barrier to be formed along the casing. It forms a lining with continuity of material preventing recirculations from bypassing the vane platforms along the inner surface of the casing.

In the following description, the terms interior or internal and exterior or external refer to a position in relation to the axis of rotation of an axial turbomachine. The axial direction corresponds to the direction along the rotational axis of the turbomachine. The terms upstream and downstream refer to the main direction of flow in the turbomachine.

FIG. 1 is a simplified representation of an axial turbine engine. In this case, it is a double-flow turbojet engine. The turbojet engine 2 comprises a first compression level, designated low-pressure compressor 4, a second compression level, designated high pressure compressor 6, a combustion chamber 8 and one or more turbine levels 10. In operation, the mechanical power transmitted to the turbine 10 via the central shaft to the rotor 12 moves the two compressors 4 and 6. The latter comprise several rows of rotor vanes associated with rows of stator vanes. The rotation of the rotor about its axis of rotation 14 thus generates a flow of air and gradually compresses the latter up to the inlet of the combustion chamber 8. Gearing-down means can increase the speed of rotation transmitted to the compressors.

An intake fan 16 is coupled to the rotor 12 and generates an air flow which is divided into a primary flow 18 passing through the various abovementioned levels of the turbomachine, and a secondary flow 20 passing through an annular conduit (shown in part) along the machine that then joins the primary flow at the turbine outlet. The secondary flow can be accelerated so as to generate a thrust reaction. The primary flow 18 and secondary flow 20 are annular flows; they are guided by the casing of the turbomachine. For this purpose, the casing has cylindrical walls or shrouds which may be internal and external.

Figure 2:
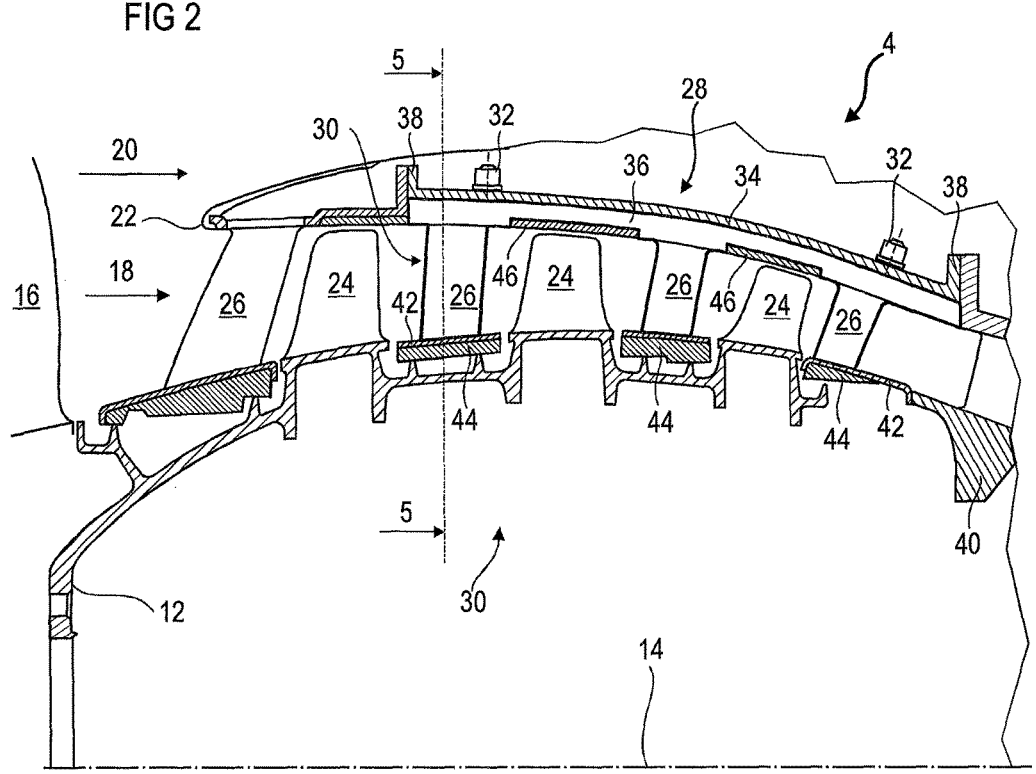
FIG. 2 is a diagram of a turbine engine compressor according to the present application.

FIG. 2 is a sectional view of a compressor of an axial turbomachine such as that of FIG. 1. The compressor may be a low-pressure compressor 4. One can observe a portion of the fan 16 and the splitter fairing 22 of the primary flow 18 and the secondary flow 20. The rotor 12 comprises several rows of rotor blades 24, in this case three. At least one or each row of rotor blades 24 may form a one-piece assembly with a rotor disk or spool 12.

The low-pressure compressor 4 comprises a plurality of rectifiers, in this case four, each of which contain a row of stator vanes 26. The rectifiers are associated with the fan 16 or a row of rotor blades for rectifying the airflow, so as to convert the flow velocity into static pressure. The rectifiers are secured to an outer casing 28 formed by several groups of vanes 30 distributed about the rotational axis 14 of the turbomachine.

The groups of vanes 30 can each have attachment portions 32 to the casing 28. They extend axially over the entire axial length of the casing. There may be attachment pins, such as screws or lockbolts. These attachment portions 32 may include deformed or deformable elements to ensure integral blockage. They may be of split shank fastener type, that is to say with two tabs folded back against the outer surface of the casing. Additionally or alternatively, the groups of vanes can be bonded to the casing.

The casing 28 has an annular wall 34 with an inner surface receiving each outer surface of the outer shroud 36 of the group of vanes 30. The wall 34 is limited axially by the outer annular flanges 38. These can be used to secure the casing 28 of the compressor to the intermediate casing 40 of the turbomachine, and to support the splitter fairing 22 at the inlet of the compressor 4.

The stator can form a composite structure in more than one respect. The casing 28 and in particular its wall 34 can be made of an organic matrix composite material reinforced by a fibrous preform. This preform may have a stack of woven carbon fibre plies. Additionally, the outer shroud 36 of the group can be made of metal, such as titanium, aluminum or their alloy. Associating a metal with an organic material makes it possible to benefit from the mechanical, chemical, thermal strength of the former and the lightness of the latter.

The compressor 4 can have several internal shrouds 42 that are connected to inner ends of the stator vanes 26. These shrouds 42 form seals that cooperate with sets of sealing members, or outer annular ribs, of the rotor 12. The shrouds 42 can include annular layers of abradable material 44 to cooperate through abrasions with these sealing members, to ensure dynamic sealing. The shrouds can be formed by angular segments of internal shrouds. Each segment is integral with a group of vanes 30, each group 30 may thus comprise several inner shroud segments distributed axially along said group 30.

Still from the point of view of sealing, the compressor can have seals 46 around the annular rows of rotor vanes 24. These seals 46 can be formed on each group of rotor vanes 40, in a plurality of annular bands axially separated by the rows of stator vane. These seals 46 can be layers of abradable material 46.

Figure 3:
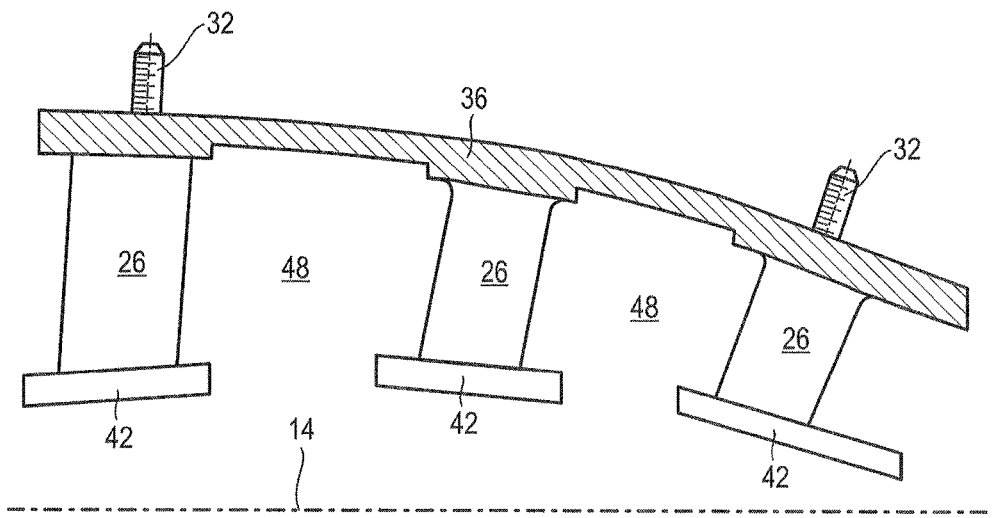
FIG. 3 illustrates an axial cross section of a group of vanes according to the present application.

FIG. 3 illustrates a profile view of a group of vanes 30. The group 30 comprises three rows of vanes 26. Although only one vane per row is visible, each row may comprise a plurality of vanes. Similarly, a group can have two, four or more rows of vanes 26.

The stator vanes 26 essentially extend radially from the outer shroud 36. The outer shroud 36, the attachment portions 32 and the vanes 23, preferably each vane 26 and each attachment portion 32 of the group 30 form a one-piece assembly, preferably formed in one piece.

The group 30 has annular passages 48 such as annular spaces 48 intended to receive an annular row of rotor vanes. These spaces 48 allow a rotor row to be mounted between two successive rows of stator vanes 26. Their axial length is greater than the majority of the axial length of a row of stator vanes 26, preferably greater than or equal to said length. The spaces 48 can also define and/or axially separate the inner shrouds 42.

Figure 4:
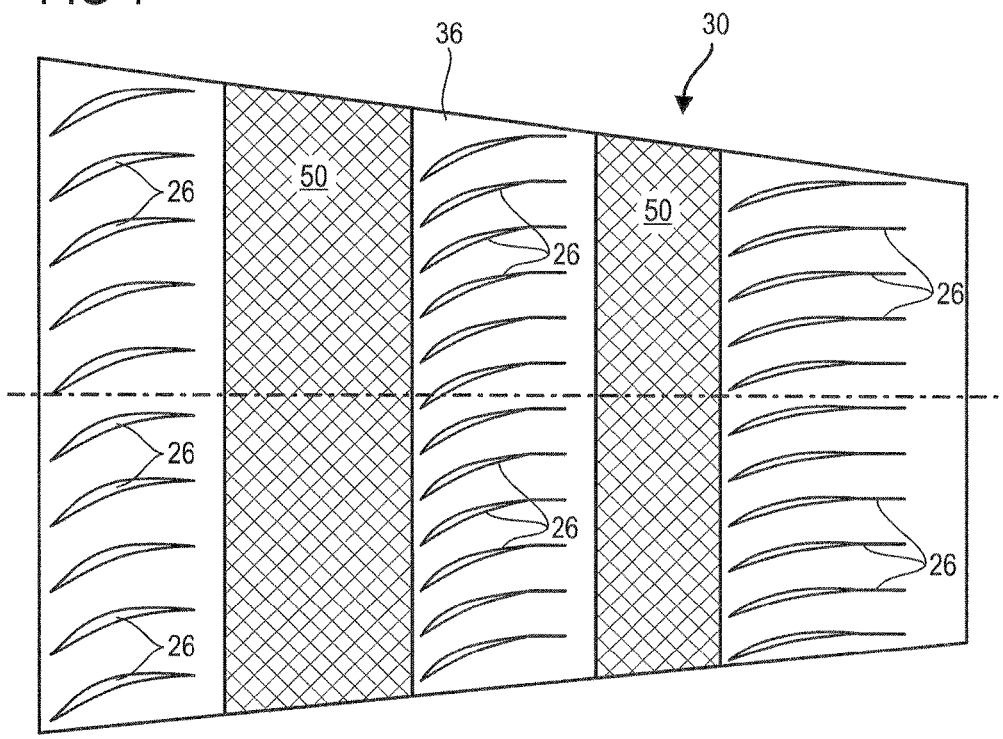
FIG. 4 outlines a plan view of a group of vanes according to the present application.

FIG. 4 outlines a plan view of a group of vanes 30 observed from the inside. For clarity, the optional inner shrouds are not shown. The number of vanes 26 per row is figurative. Each row may comprise at least two vanes 26, preferably at least ten vanes 26, and possibly at least thirty vanes 26.

The vanes 26 can form a grid. Due to the reduction in diameter of the primary flow path that passes through the compressor, the outer shroud 36 narrows downstream. The outer shroud 36 has seal receiving zones 50. These zones 50 can be circular arcs and arranged between the rows of vanes 26. Their inner surface can be essentially rough, of roughness Ra greater than or equal to 10 µm, preferably greater than or equal to 50 µm. The zones 50 may be covered with anchoring mesh.

The stator vanes 26 of each row are evenly spaced, and have the same angular orientation in the flow. They are immovable relative to each other. Advantageously, the vanes of the same row are identical. Optionally, the spacing between the vanes can vary locally as well as their angular orientation. Some vanes may be different from the rest of the vanes of their row.

Figure 5:
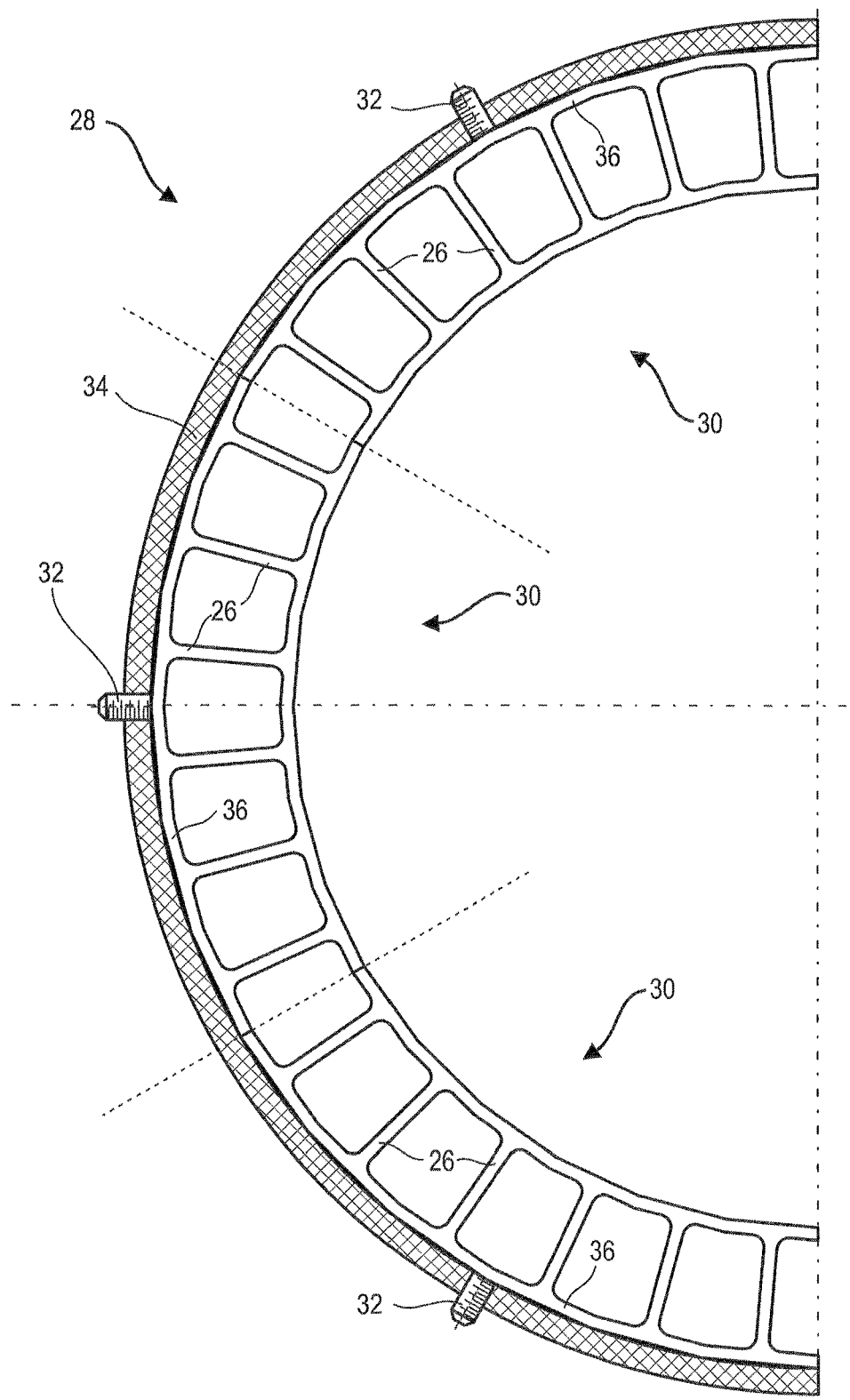
FIG. 5 is a sectional view of the stator along the axis 5-5 plotted in FIG. 2 according to a first embodiment of the present application.

FIG. 5 represents a sectional view of the stator of the compressor according to a first embodiment of the present application. The cross section is made along the axis 5-5 plotted in FIG. 2. Only half of the stator is shown. The attachment portions 32 pass through the wall 34 of the casing 28 via the fastening openings.

The compressor includes a casing 28 formed from half-shells joined by means of axial flanges extending radially. It also has several groups of vanes 30, the combination of which forms a closed circle. Here, the half-shell supports three groups of vanes 30, six groups distributed around the axis of rotation 14 can form a closed loop. However, the circumference of the casing can be formed by four, eight, or any other number of groups. The outer shrouds 36 cover the entire circumference of the inner surface of the casing 28.

The groups 30 have inner shroud segments 42. These may be one-piece with their respective group, preferably integral with the vanes and the outer shroud of the associated group. They receive the annular seals which seal the sealing members of the rotor. These seals can be applied to the group 30 before or after they are mounted on the casing. The joining of the inner shroud segments forms at least one circle, preferably several circles. A group of vanes 30 can be achieved by additive manufacturing; powder-based for example. It is contemplated to produce a group by the lost wax casting process.

According to an alternative, the segments of inner shrouds are attached to the inner ends of the vanes of the groups.

Figure 6:
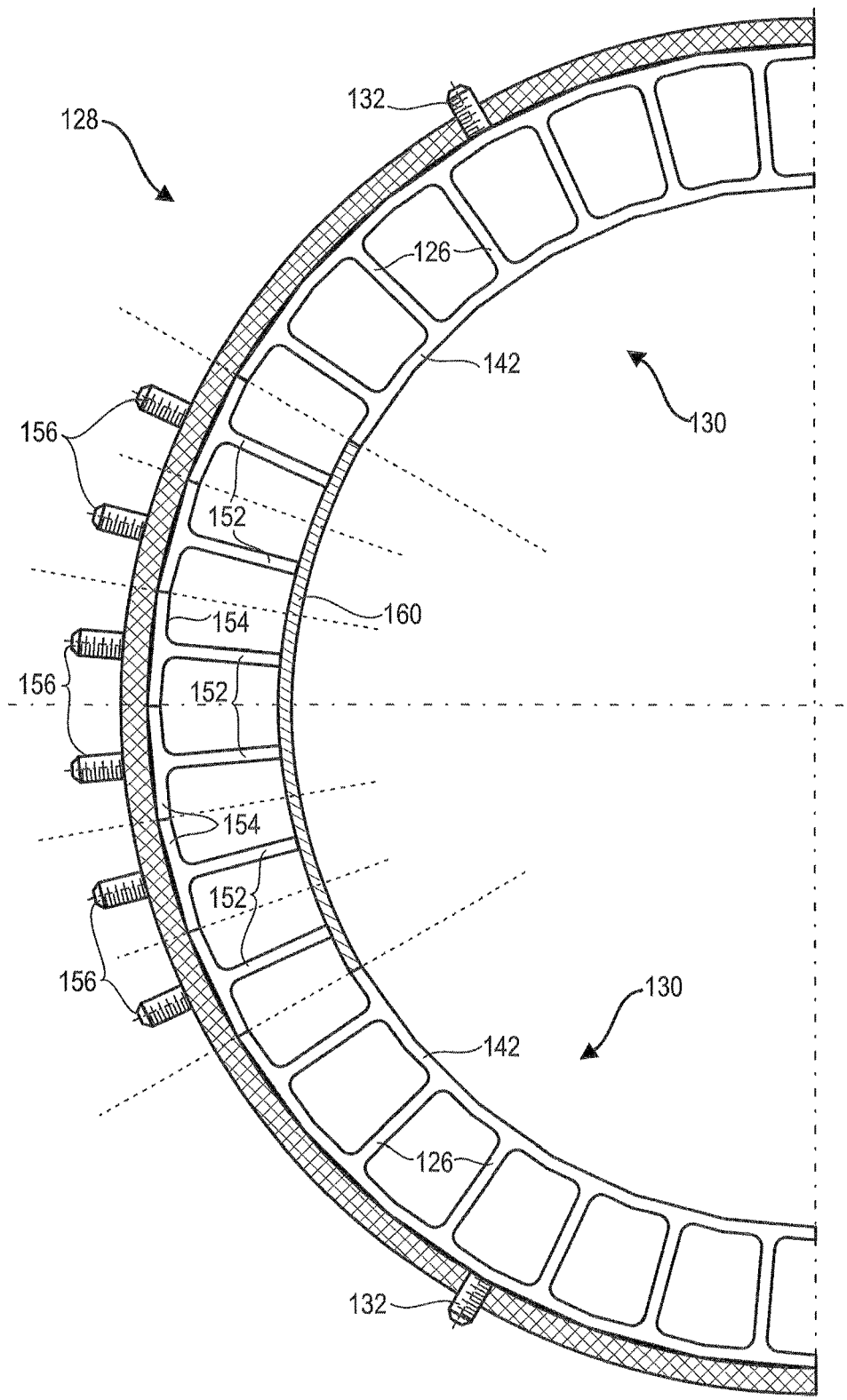
FIG. 6 is a sectional view of the stator along the axis 5-5 plotted in FIG. 2 according to a second embodiment of the present application.

FIG. 6 represents a sectional view of the stator of the compressor according to a second embodiment of the present application. The section is made along the axis 5-5 plotted in FIG. 2. This FIG. 6 reflects the numbering of the previous figures for the identical or similar elements, although the numbering is incremented from 100. Specific numbers are used for elements specific to this embodiment.

The compressor has a mixed configuration in that it has groups of vanes 130 secured in a group to the casing 128, and vanes 152 secured in an individual manner. The separate vanes 152 can each comprise individual platforms 154 with attachment pins 156. According to an option, the vanes 152 may be combined into rows of vane sub-groups. These sub-groups can contain a single row of vanes. The vanes, that is to say the radial parts passing through the primary flow, of the separated vanes 152 can be similar to the vanes 126 of groups 130.

Segments of attached internal shrouds 160 can be secured to the inner ends of the separated vanes 152 outside the groups of vanes 130. These attached internal shrouds 160 can be secured to the inner shrouds 142 of the groups 130. Such a composite assembly increases the stiffness of the assembly owing to the groups 130, which can be metallic, and the lightness by inserting attached inner shrouds 160 made of composite material.

The foregoing description is described in relation to a casing. However, the groups of vanes can be adapted to any part of a turbomachine, including a turbine. The shapes of the vanes can be re-engineered; the use of Inconel type metals or ceramic materials is possible.

I claim:

1. An axial turbomachine stator, comprising:
   an outer annular casing with an inner annular surface; and
   at least two one-piece groups of vanes, each one-piece group of vanes comprising:
      several rows of stator vanes arranged along a circumference of the casing, the rows being axially offset from each other to define at least an upstream row of stator vanes, a downstream row of stator vanes, and at least one intermediate row of stator vanes; and
      an outer shroud for attaching the vanes to the outer annular casing, the outer shroud extending axially over the entire length of the outer annular casing;
   wherein at least one outer shroud of the at least two one-piece groups of vanes comprises:
      an outer surface in contact with the inner annular surface of the outer annular casing axially along at least two of the several rows of stator vanes, such that the stator is void of gap between the outer surface and the inner annular surface of the outer annular casing.

2. The axial turbomachine stator of claim 1, wherein at least one or each outer shroud of the one-piece groups of vanes matches the inner annular surface of the outer annular casing.

3. The axial turbomachine stator of claim 1, wherein at least one or each outer shroud of the one-piece groups of vanes forms a hermetic skin over the entire axial length of the outer annular casing.

4. The axial turbomachine stator of claim 1, wherein the outer annular casing comprises:
   an annular wall on which the inner annular surface is formed; and
   two annular mounting flanges arranged at the axial ends of the annular wall.

5. The axial turbomachine stator of claim 1, wherein the outer annular casing is made of composite material with an organic matrix.

6. The axial turbomachine stator of claim 1, wherein at least one group of the at least two one-piece groups of vanes is integrally formed.

7. The axial turbomachine stator of claim 1, wherein at least one outer shroud of the at least two one-piece groups of vanes comprises:
   a main outer surface with external cavities closed by the outer annular casing.

8. The axial turbomachine stator of claim 1, wherein at least one or each group of the at least two one-piece groups of vanes comprises:
   at least three rows of stator vanes, the rows being distributed axially along the outer annular casing.

9. The axial turbomachine stator of claim 1, further comprising:
   an annular space separating two consecutive rows of vanes of a group of vanes of the at least two one-piece groups of vanes, the annular space being adapted to receive an annular row of rotor blades of the turbomachine.

10. The axial turbomachine stator of claim 1, further comprising:
    further vanes, each further vane having an attachment platform connected to the outer annular casing, the platforms of the further vanes being arranged between two groups of vanes of the at least two one-piece groups of vanes.

11. The axial turbomachine stator of claim 1, wherein each vane of the at least two one-piece groups of vanes has a respective inner end and at least one group of the at least two one-piece groups of vanes comprises:
    inner shrouds integral with the inner ends of the vanes of the group.

12. The axial turbomachine stator of claim 11, further comprising:
    at least one or more angular segments of inner shrouds arranged between the groups of vanes, the segments being connected to the inner ends of the vanes of the groups of vanes or to the inner shrouds of the groups of vanes.

13. The axial turbomachine stator of claim 1, wherein at least one or each group of the at least two one-piece groups of vanes comprises:
    one or more annular zones for receiving seals, intended to ensure sealing with the rows of rotor blades, the zones comprising:
       a surface with a roughness Ra greater than 10 μm.

14. An axial turbomachine stator, comprising:
    an outer annular casing with an inner annular surface; and
    at least two groups of vanes, each group of vanes comprising:
       at least two rows of stator vanes arranged along the circumference of the outer annular casing, the rows being axially offset from each other;
       an outer shroud for attaching vanes to the outer annular casing, the outer shroud and the rows of vanes of the group being one-piece, wherein the outer shroud comprises:
          an outer surface in contact with the inner annular surface of the outer annular casing axially along the at least two rows of stator vanes, such that the stator is void of gap between the outer surface and the inner annular surface of the outer annular casing.

15. The axial turbomachine stator of claim 14, wherein the outer surface of the outer shroud is in contact with the inner annular surface of the outer annular casing over more than half of the axial length of said outer annular casing.

16. A turbomachine, comprising:
    a stator comprising:
    an outer annular casing with an inner annular surface; and
    at least two groups of vanes, each group of vanes being one-piece and comprising:
       a plurality of axially offset rows of stator vanes which are arranged along a circumference of the outer annular casing; and
       an outer shroud for attaching vanes to the outer annular casing, the outer shroud comprising:
          an outer surface in contact with the inner annular surface of the outer annular casing axially along the plurality of axially offset rows of stator vanes, such that the stator is void of gap between the outer surface and the inner annular surface of the outer annular casing.

17. The turbomachine of claim 16, further comprising:
a low-pressure compressor with a compressor stator, the stator being the compressor stator.

18. The turbomachine of claim 16, further comprising:
a one-piece rotor;
wherein the outer annular casing comprises:
   two half-shells fixed together around the one-piece rotor.

\* \* \* \* \*